(12) United States Patent
Funk et al.

(10) Patent No.: US 12,427,834 B2
(45) Date of Patent: Sep. 30, 2025

(54) PTC HEATING DEVICE

(71) Applicant: Mahle International GmbH, Stuttgart (DE)

(72) Inventors: Lena Funk, Karlsruhe (DE); Wolfgang Seewald, Tamm (DE); Falk Viehrig, Stuttgart (DE)

(73) Assignee: Mahle International GmbH (DE)

( * ) Notice: Subject to any disclaimer, the term of this patent is extended or adjusted under 35 U.S.C. 154(b) by 539 days.

(21) Appl. No.: 17/017,672

(22) Filed: Sep. 10, 2020

(65) Prior Publication Data

US 2021/0070146 A1    Mar. 11, 2021

(30) Foreign Application Priority Data

Sep. 11, 2019    (DE) .......................... 102019213862.4

(51) Int. Cl.
*B60H 1/22* (2006.01)
*H05B 1/02* (2006.01)

(52) U.S. Cl.
CPC ......... *B60H 1/2218* (2013.01); *B60H 1/2221* (2013.01); *H05B 1/0236* (2013.01); *H05B 2203/02* (2013.01)

(58) Field of Classification Search
CPC ... F24H 9/1872; B60H 1/2218; B60H 1/2221; H05B 1/0236; H05B 2203/02;
(Continued)

(56) References Cited

U.S. PATENT DOCUMENTS 5,716,481 A * 2/1998 Kobayashi ............. H01G 4/308
156/289
6,152,597 A * 11/2000 Potega .............. H01M 10/4257
327/512
(Continued)

FOREIGN PATENT DOCUMENTS

CN    1525795 A    9/2004
CN    107535016 A    1/2018
(Continued)

OTHER PUBLICATIONS

English abstract for EP-1439738.
(Continued)

*Primary Examiner* — Elizabeth M Kerr
*Assistant Examiner* — Simpson A Chen
(74) *Attorney, Agent, or Firm* — Fishman Stewart PLLC (57) ABSTRACT

The present disclosure describes a PTC heating device for, e.g., an air-conditioning system of a motor vehicle. The PTC heating device includes first and second PTC thermistors each having a first and second electrical contacting surface that lie opposite one another. The PTC thermistors are arranged sandwiched between a first and a second electrical insulation. A first electrical line path is arranged between the first PTC thermistors and the first electrical insulation. The first electrical line path is electrically connected to the first contacting surface of the first PTC thermistors. A second electrical line path is arranged between the second PTC thermistors and the first electrical insulation. The second electrical line path is electrically isolated from the first line path and electrically connected to the first contacting surface of the second electric PTC thermistors.

20 Claims, 4 Drawing Sheets

(58) Field of Classification Search
CPC ... H05B 1/02; H05B 3/03; H05B 3/06; H05B 3/12; H05B 3/26; H05B 3/42; H05B 3/50; H05B 2203/023
USPC .......................................................... 219/202
See application file for complete search history.

(56) References Cited

U.S. PATENT DOCUMENTS

| | | |
|---|---|---|
| 7,098,426 B2 | 8/2006 | Bohlender |
| 10,549,604 B2 | 2/2020 | Min |
| 2003/0156829 A1* | 8/2003 | Cox .................. H05B 3/34 392/390 |
| 2004/0169027 A1 | 9/2004 | Bohlender et al. |
| 2013/0186966 A1* | 7/2013 | Taguchi .............. H05B 3/24 392/496 |
| 2014/0076878 A1* | 3/2014 | Shimura .............. H05B 3/03 399/329 |
| 2014/0342191 A1* | 11/2014 | Shin .................. H05K 1/0201 429/7 |
| 2018/0326817 A1* | 11/2018 | Miss .................. F24H 3/0429 |
| 2019/0084374 A1* | 3/2019 | Min .................... F24H 9/1872 |
| 2020/0286653 A1* | 9/2020 | Feustel ............... H01C 1/08 |
| 2022/0132629 A1* | 4/2022 | Barbano .............. H05B 3/78 |

FOREIGN PATENT DOCUMENTS

| | | |
|---|---|---|
| EP | 1439738 A2 | 7/2004 |
| EP | 1884383 A1 | 2/2008 |
| EP | 3290819 A1 | 3/2018 |

OTHER PUBLICATIONS

English abstract for EP-3290819.
Chinese First Office Action dated Jul. 6, 2022 and Chinese Search Report dated Jun. 28, 2022 for Chinese Patent Application No. 202010935436.5.

* cited by examiner

PTC HEATING DEVICE

CROSS-REFERENCE TO RELATED APPLICATION

This application claims priority to German Application No. DE 10 2019 213 862.4 filed on Sep. 11, 2019, the contents of which are hereby incorporated by reference in its entirety.

TECHNICAL FIELD

The present invention relates to a PTC heating device, in particular for an air-conditioning system of a motor vehicle, and to a motor vehicle having such an air-conditioning system.

BACKGROUND

PTC heating devices, i.e. heating devices with PTC thermistors—also known as PTC heating elements to the relevant person skilled in the art—are employed in air-conditioning systems of motor vehicles in order to heat air prior to being conducted into the vehicle interior.

In modern electric vehicles, i.e. in motor vehicles with electric drive it is advantageous when the PTC heating device is supplied with electric energy from the high-voltage vehicle system, which has a voltage level of 400 volt and higher. For such high-voltage vehicle systems PTC heating devices with PTC heating elements are known, which are only activated jointly. Thus it is not possible with these conventional PTC heating devices to activate the PTC heating elements individually or at least in groups, which is necessary for example when zones of the vehicle interior about the vehicle seat and about the co-driver seat are to be supplied with air of different temperature.

SUMMARY

It is an object of the present invention to create an improved embodiment for a PTC heating device with which the disadvantage mentioned above is eliminated. According to the invention, this object is solved through the subject of the independent patent claims. Advantageous embodiments are subject of the dependent patent claims.

Accordingly, the basic idea of the invention is to supply the PTC thermistors or PTC heating elements with electric energy with the help of two electrical supply lines that are electrically isolated from one another. Thus, those (first) PTC heating elements, which are connected to a first of the two supply lines, can be supplied with electric energy and thus controlled independently of those (second) PTC heating elements, which are connected to a second of the two supply lines. In this way it is possible upon arrangement of the first and second PTC heating elements in different air paths of the air-conditioning system to individually heat the air conducted through these air paths and subsequently in different zones of the vehicle interior.

A PTC heating device according to the invention, in particular for an air-conditioning system of a motor vehicle, comprises first and second PTC thermistors, each of which comprises a first and second electrical contacting surface, which are located opposite one another. The PTC thermistors, i.e. both the first and also the second PTC thermistors, are arranged sandwich-like between a first and a second electrical insulation. Between the first PTC thermistors and the first electrical insulation a first electrical line path is arranged according to the invention. The first electrical line path is electrically connected to the first contacting surfaces of the first electric PTC thermistors. Analogous to this, a second electrical line path for electrically connecting to an electrical current source is arranged according to the invention between the second PTC thermistors and the first insulation, namely electrically isolated from the first line path. The second electrical line path is electrically connected to the first contacting surfaces of the second electric PTC thermistors. Both line paths can be connected to an electric current source independently of one another. By means of the two line paths electrically isolated from one another, the first and second PTC thermistors can thus be electrically energized.

Practically, the first and second PTC thermistors are arranged next to one another in a common main plane. In this version, the first and second PTC thermistors are arranged sandwich-like between the first and the second insulation along a main direction, which extends perpendicularly to the main plane. Practically, the first and the second line path are arranged in a first subsidiary plane, which extends parallel to the main plane. Practically, the at least one third line path, preferentially the third and fourth line path, is/are arranged in a second subsidiary plane, which extends parallel to the main plane.

Practically, the first or/and second electrical insulation can be formed as first or second insulating board.

According to a preferred embodiment, between the first and second PTC thermistors and the second electrical insulation at least one third electrical line path for electrically connecting to an electric current source is arranged. In this embodiment, the third electrical line path is electrically connected to the second contacting surfaces of the first and second electric PTC thermistors. By means of the at least one third line path, the PTC thermistors can be connected to an electrical earth connection.

Particularly preferably, the first or/and second or/and at least one third line path is/are each formed as areal conductor track, which covers the respective contacting surface of the PTC thermistors concerned areally, preferentially completely. Such conductor tracks can—in particular by printing the electrical insulation concerned—be produced in an easy manner. Because of their areal design, they ensure a low-resistance electrical contact with the PTC thermistors.

Practically, exactly one third line path can be provided, which is electrically connected to the second contacting surfaces both of the first and also of the second electric PTC thermistors. By means of the at least one third line path, the PTC thermistors can be connected to a common earth connection.

Alternatively to this, a third and a fourth line path can be provided, which preferentially have the same path course on the second electrical insulation as the first or second electrical line path on the first electrical insulation. In this version, the third line path is electrically connected to the second contacting surfaces of the first electric PTC thermistors and—electrically isolated from these contacting surfaces—the fourth line path connected to the second contacting surfaces of the second electric PTC thermistors.

According to a further preferred embodiment, a path course of the third line path on the second insulation substantially corresponds to the path course of the first electrical line path on the first insulation. Alternatively or additionally, a path course of the fourth line path on the second insulation can correspond to the path course of the second electrical line path on the first insulation. Because of its symmetry characteristics, this embodiment is particularly easily and thus cost-effectively producible.

According to a preferred embodiment, the first and the second line path are arranged on a side of the first electrical insulation or of the first insulation board facing the PTC thermistors. In this version, the at least one third line path, in particular the third and the fourth line path, are arranged on a side of the second electrical insulation or the second insulation board facing the PTC thermistors. This embodiment is a particularly compact construction.

Particularly preferably, the material of the first or/and second electrical insulation is an electrically insulating ceramic. Since a ceramic has a high thermal conductivity, the heat generated by the PTC thermistors can be discharged as desired from the PTC heating device for heating air.

According to a preferred embodiment, the first line path covers the first contacting surfaces of the first PTC thermistors completely in each case. Accordingly, the second line path in this embodiment covers the first contacting surfaces of the second PTC thermistors completely in each case. Finally, the at least one third line path covers the second contacting surfaces of the first and second PTC thermistor completely in each case. Such an areal electrical contacting is accompanied by a low electrical resistance at the transition between line path and contacting surface.

Practically, all first and second PTC thermistors are arranged along a longitudinal direction at a distance next to one another. Here, an entirety of the second PTC thermistors follows an entirety of the first PTC thermistors in the longitudinal direction. Thus, there is exactly one transition of the first to the second PTC thermistors, which is characterized in that a second PTC thermistor follows a first PTC thermistor. This version can be electrically wired in a particularly simple manner.

Particularly preferably, the first line path interconnects the first contacting surfaces of the first PTC thermistors along the longitudinal direction and the second line path interconnects the first contacting surfaces of the second PTC thermistors along the longitudinal direction. In this version, the second line path extends along the longitudinal direction passing the first PTC thermistors at a distance. In this way, an undesirable electrical creep current between the first and second line path can be largely or even completely avoided.

According to an advantageous further development—in particular in a plan view onto the first insulation along the previously described main direction—, the first line path is arranged in a first end portion and the second line path in a second end portion of the first electrical insulation where they extend along the longitudinal direction. Along the transverse direction, the two end portions lie opposite one another in the transverse direction. Thus, the first and the second line path also lie opposite one another in the transverse direction. With this further development, the adherence of creep and air gaps is ensured to a particular degree.

According to another preferred embodiment, the second line path, in the region of the first PTC thermistors, forms a first path portion and in the region of the second PTC thermistors a second path portion. In this embodiment, the first path portion is arranged along a transverse direction which extends perpendicularly to the longitudinal direction, offset relative to the second path portion. This embodiment also ensures maintaining creep and air gaps.

Since the first line path is only required for the electric current supply of the first PTC thermistors, the first line path advantageously ends at the transition from the first to the second PTC thermistors.

Particularly preferably, the second PTC thermistors can be arranged transversely to the longitudinal direction offset relative to the first PTC thermistors.

Alternatively to this, the second PTC thermistors can be arranged transversely to the longitudinal direction without offset relative to the first PTC thermistors.

Particularly preferably, the first and the second electrical line path have, at a longitudinal end—determined according to the longitudinal direction—a first or second electrical connection for connecting the first or second line path to the electric current source.

Particularly preferably, the first line path is arranged between the first insulation and the first PTC thermistors. Alternatively or additionally, the second line path is arranged between the first insulation and the second PTC thermistors. Alternatively or additionally to this, the third line path can be arranged between the second insulation and the first as well as second PTC thermistors.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

There it shows, in each case schematically,

FIG. 1A an example of a PTC heating device according to the invention in a cross section perpendicularly to a longitudinal direction of the PTC heating device, FIG. 1B the arrangement of the PTC thermistors and of the two electrical insulations in a lateral view, FIG. 2A the PTC heating device in a plan view onto the first insulation along the main direction, FIG. 2B the PTC heating device in a plan view onto the second insulation along the main direction, FIGS. 3A and 3B a first version of the example of FIGS. 2A and 2B, FIGS. 4A and 4B a second version of the example of FIGS. 2A and 2B.

DETAILED DESCRIPTION

Figure 1:
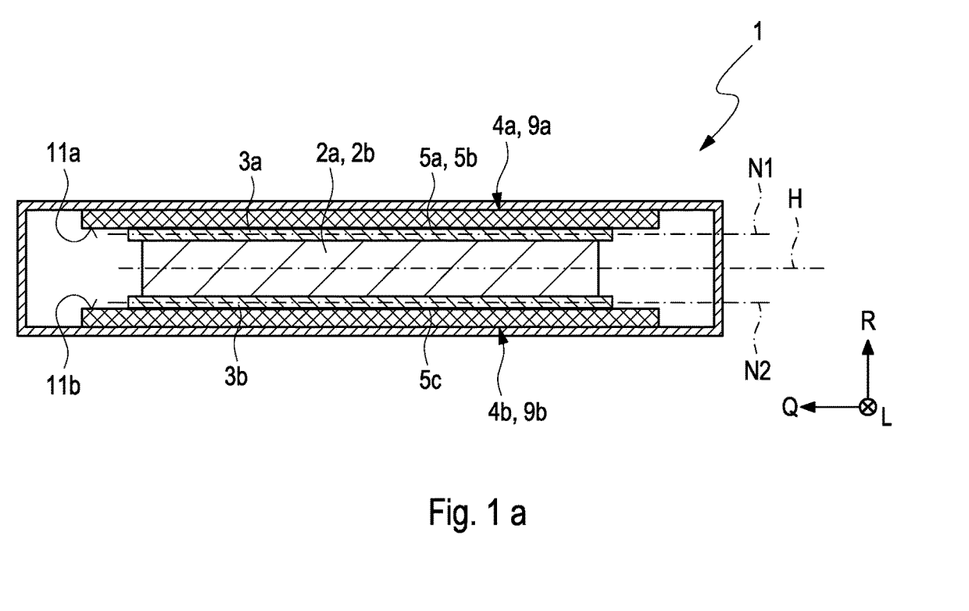

FIG. 1 illustrates an example of a PTC heating device 1 according to the invention in a cross section perpendicularly to a longitudinal direction L of the PTC heating device 1. PTC heating device 1 comprises first and second PTC thermistors 2a, 2b. Each of the PTC thermistors 2a, 2b comprises a first and a second electrical contacting surface 3a and 3b respectively, which serve for the electrical contacting of the respective PTC thermistor 2a and 2b respectively to the two poles of an electric current source (not shown). The first and second PTC thermistors 2a, 2b are arranged, with respect to the main direction R, which extends perpendicularly to the longitudinal direction L, sandwich-like between a common first and a common second electrical insulation 4a, 4b, which likewise lie opposite one another along the main direction R.

As is evident from FIG. 1a, the first and second PTC thermistors 2a, 2b are arranged in a main plane H. The contacting surfaces 3a, 3b of the PTC thermistors 2a, 2b are arranged in subsidiary planes N1, N2, which extend parallel to the main plane H. The first and second contacting surfaces 3a, 3b of a respective PTC thermistor 2a, 2b lie opposite one another in the main direction R, which extends orthogonally to the main plane H and the subsidiary planes N1, N2. In the example scenario, the first electrical insulation 4a is formed as first insulation board 9a and the second electrical insulation 4b as second insulation board 9b. Both insulation boards 9a, 9b are practically arranged in a plane each, which extends parallel to the main plane H. The material of the first and second electrical insulation 4a, 4b can be an electrically insulating ceramic.

FIG. 1b shows the PTC heating device 1 of FIG. 1a in a lateral view. FIG. 2a shows the PTC heating device 1 of the FIGS. 1a, 1b in a plan view onto the first insulation 4a along the main direction R, FIG. 2b in a plan view onto the second insulation 4b along the main direction R. In the FIGS. 1a, 2a, 2b, four PTC thermistors 2a and four second PTC thermistors 2b are each exemplarily shown.

According to FIG. 2a, a first electrical line path 5a is arranged between the first PTC thermistors 2a and the first electrical insulation 4a. The same is formed for connecting the first contacting surfaces 3a of the first PTC thermistors 2a of the said electrical current source. To this end, the first electrical line path 5a is electrically connected to the first contacting surfaces 3a of the first electric PTC thermistors 2a.

Analogous to this—electrically isolated from the first line path 5a—a second electrical line path 5b is arranged between the second PTC thermistors 2b and the first electrical insulation 4a. This line path 5b is formed for connecting the first contacting surfaces 3a of the second PTC thermistors 2b to the electric current source. To this end, the second electrical line path 5b is electrically connected to the first contacting surfaces 3a of the second electric PTC thermistors 2b. By means of the two line paths 5a, 5b, the first and second PTC thermistors 2a, 2b can be supplied with electric current from the current source independently of one another—in particular electrically isolated from one another.

According to FIG. 2b, a third electrical line path 5c for electrically connecting the second contacting surfaces 3b both of the first and also of the second PTC thermistors 2a, 2b to the electrical current source is arranged between the first and second PTC thermistors 2a, 2b and the second electrical insulation 4b. Here, the third electrical line path 5c is electrically connected to the second contacting surfaces 3b of the electric PTC thermistors 2a, 2b.

Figure 2:
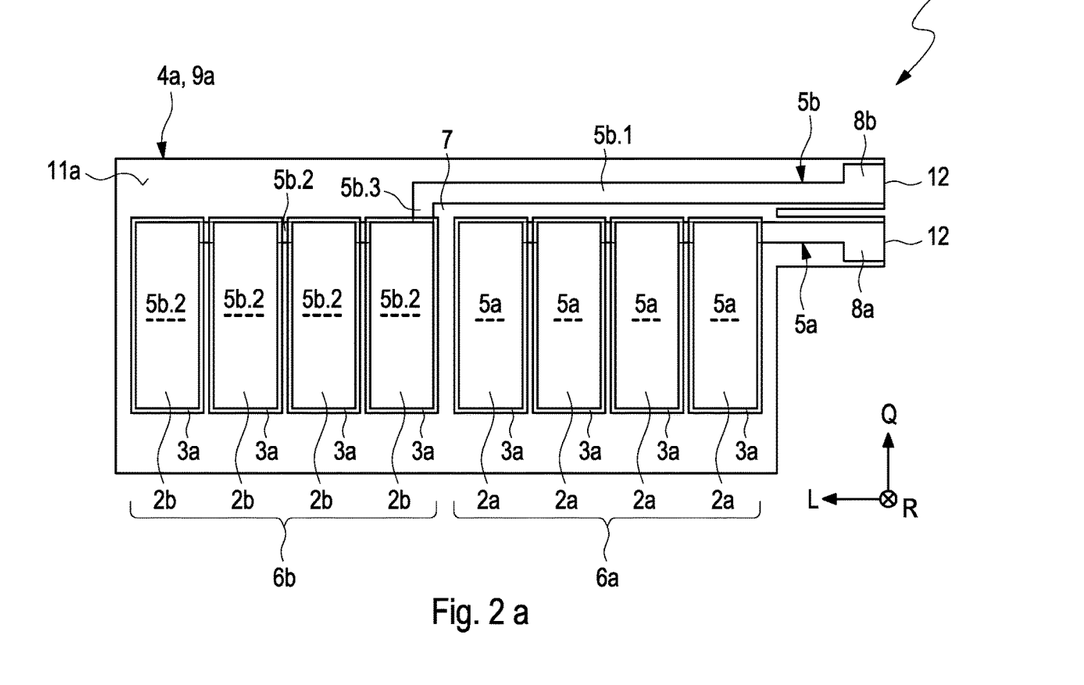

In the example of FIGS. 1 and 2, exactly one third line path 5c is present in the PTC heating device 1. This third line path 5c is electrically connected to the second contacting surfaces both of the first PTC thermistors 2a and also of the second electric PTC thermistors 2b. For the sake of clarity, the line paths 5a, 5b, 5c are not shown in the FIGS. 1a, 1b.

As illustrated by the FIGS. 1b, 2a, 2b, all first and second PTC thermistors are arranged along a longitudinal direction L spaced apart next to one another. Here, the entirety 6b of the second PTC thermistors 2b follows in the longitudinal direction L the entirety 6a of the first PTC thermistors 2a. Thus, the first and second PTC thermistors 2a, 2b are each arranged in groups.

In the example of the figures, the first and second line path 5a, 5b are arranged on a side 11a facing the PTC thermistors 2a, 2b of the first electrical insulation 4a and the first insulation board 9a respectively. Accordingly, the third line path 5c, 5d is arranged on a side 11b facing the PTC thermistors of the second electrical insulation 4b and the second insulation board 9b respectively.

According to FIG. 2a, the first line path 5a interconnects the first contacting surfaces 3a of the first PTC thermistors 2a along the longitudinal direction L. Accordingly, the second line path 5b interconnects the first contacting surfaces 3a of the second PTC thermistors along the longitudinal direction L. As is additionally evident from FIG. 2a, the second line path 5b is routed along the longitudinal direction spaced apart from the first PTC thermistors laterally past the same. The first line path 5a ends at a transition 7 between the first and second PTC thermistors 2a, 2b. Thus, in the region of the first PTC thermistors 2a the second line path 5b forms a first path portion 5b.1 and in the region of the second PTC thermistors 2b a second path portion 5b.2.

In the example of FIG. 2a, the first path portion 5b.1 is arranged, along a transverse direction Q, which extends perpendicularly to the longitudinal direction L, offset relative to the second path portion 5b.2. Here, a transition path portion 5b.3 extending in the transverse direction is provided on the transition 7, which extends in the transverse direction Q and electrically connects the first path portion 5b.1 to the second path portion 5b.2. The first line path 5a extends in a straight line along the longitudinal direction L and ends before the transition 7 of the second line path 5b. The third line path 5c likewise extends in a straight line along the longitudinal direction L. The first and the second electrical line path have, at a (with respect to the longitudinal direction L) first longitudinal end 12, a first and second electrical connection 8a and 8b respectively for connecting the first and second line path 5a, 5b to the electric current source. The third electrical line path can likewise comprise a third electrical connection 8c at the first longitudinal end 12 for connecting the third line path 5c to the electric current source.

In the example of FIGS. 2a, 2b, the first line path 5a covers the first contacting surfaces 3a of the first PTC thermistors 2a completely in each case. The second line path 5b covers the first contacting surfaces 3a of the second PTC thermistors 2b completely in each case. The third line path 5c covers the second contacting surfaces 3b of the first and second PTC thermistor completely in each case.

Figure 3A:
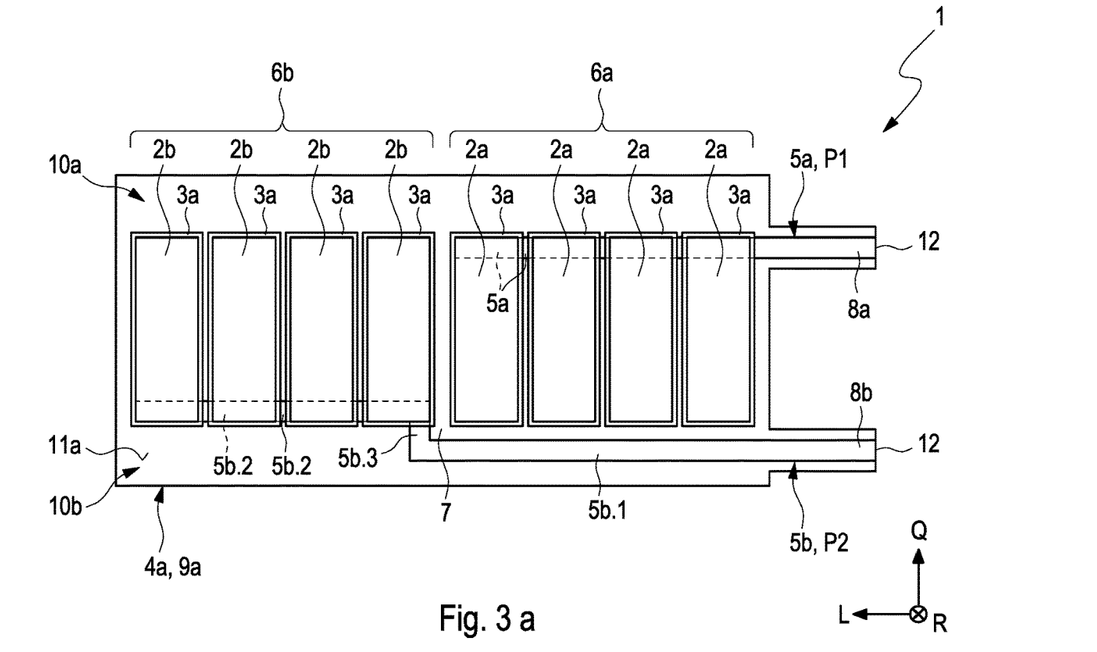
Figure 3B:
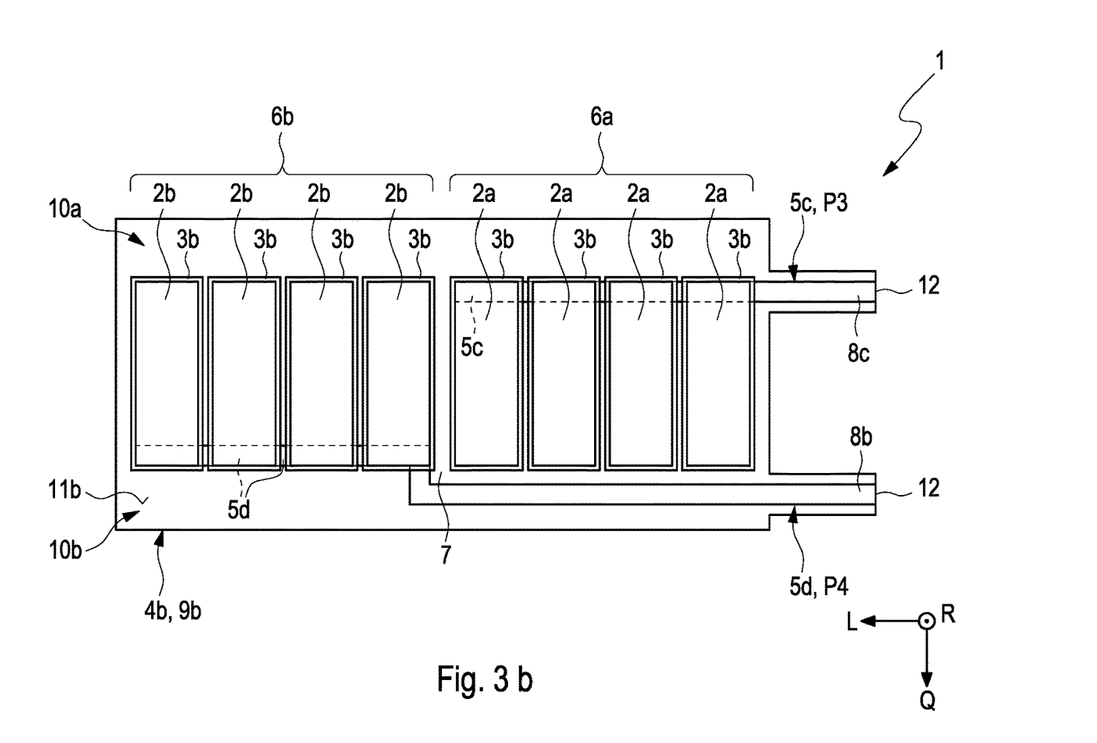

The FIGS. 3a and 3b show a first version of the example of the FIGS. 2a and 2b. On the first insulation 4a shown in FIG. 3a, the first and the second electrical line path 5a, 5b are arranged analogously to the example of FIG. 2a. In contrast to the example of FIG. 2a, the first line path 5a, in the example of the FIG. 3a, is arranged in a, with respect to the transverse direction Q, first end portion 10a. The second line path 5b is arranged, in a, with respect to the transverse direction Q, second end portion 10b of the first electrical insulation 4a. As is evident from FIG. 3a, the two end portions 10a, 10b lie opposite one another in the transverse direction Q. Both line paths 5a, 5b extend in the respective end portion 10a and 10b respectively on the first insulation 4a along the longitudinal direction L.

As is further evident from FIG. 3b, the PTC heating device 1 comprises a third line path 5c and a fourth line path 5d that is formed electrically isolated from the same, which are both arranged on the second electrical insulation 4b. Here, a fourth electrical connection 8d is provided for the fourth line path 5d analogously to the line paths 5a, 5b, 5c.

As is additionally evident from FIG. 3b, the third line path 5c is electrically connected to the second contacting surfaces 3b of the first electric PTC thermistors 2a. Electrically isolated from these second contacting surfaces 3b of the first PTC thermistors 2a, the fourth line path 5d is connected to the second contacting surfaces 3b of the second electric PTC thermistors 2b.

A comparison of the FIG. 3b with FIG. 3a shows that the third and the fourth line path 5c, 5d is arranged with the same path course P3, P4 on the second electrical insulation 4b as the first and second electrical line path 5a, 5b with path course P1 and P2 respectively on the first electrical insulation 4a. A path course P3 of the third line path 5c on the second insulation 4b is identical to a path course P1 of the first electrical line path 5a on the first insulation 4a. A path course P4 of the fourth line path 5d on the second insulation 4b is identical to the path course P2 of the second electrical line path 5b on the first insulation 4a.

In the example of FIGS. 3a, 3b, the first line path 5a—in contrast with the example of the FIGS. 2a, 2b—covers the first contacting surfaces 3a of the first PTC thermistors 2a only incompletely in each case. The second line path 5b covers the first contacting surfaces 3a of the second PTC thermistors 2b incompletely in each case. The third line path 5c covers the second contacting surfaces 3b of the first PTC thermistors 2a only incompletely in each case. The fourth line path 5d covers the second contacting surfaces 3b of the second PTC thermistors 2b only incompletely in each case.

Figure 4:
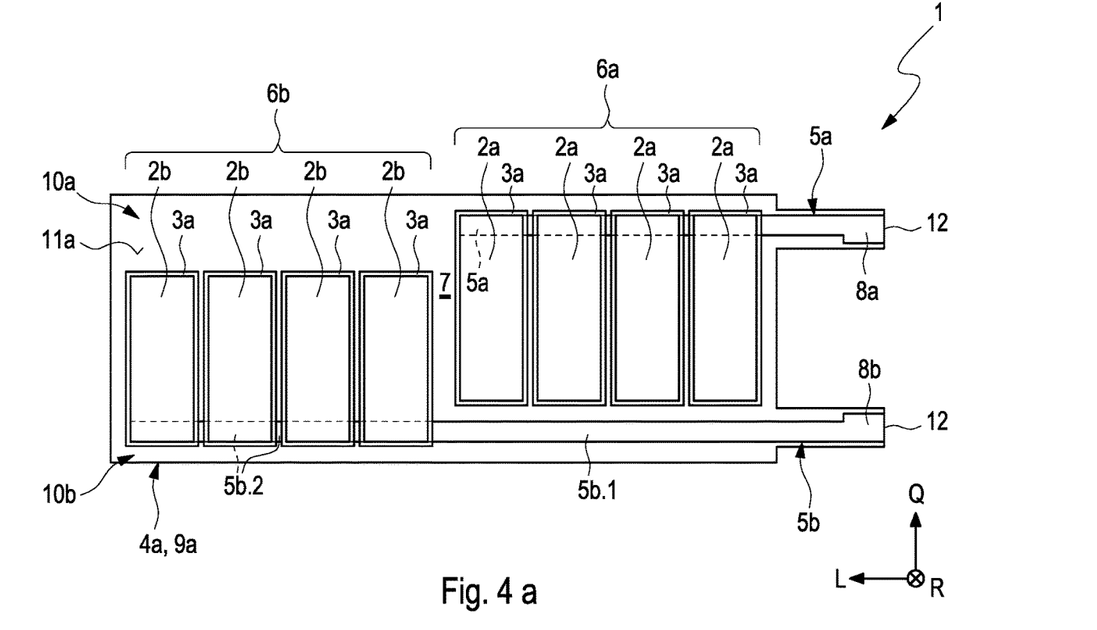

The FIGS. 4a and 4b show a second version of the example of the FIGS. 2a and 2b. In the example of FIG. 4, the second PTC thermistors 2b are arranged offset relative to the first PTC thermistors 2a along the transverse direction Q.

In the example of FIG. 4a, the first line path 5a is arranged in the, with respect to the transverse direction Q, first end portion 10a on the first insulation 4a. The second line path 5b is arranged in the, with respect to the transverse direction Q, second end portion 10b of the first electrical insulation 4a. Both line paths 5a, 5b extend on the first insulation 4a in a straight line each along the longitudinal direction L, wherein the first line path 5a ends at the transition 7 between the first and the second PTC thermistors 2a, 2b. The second path portion 5b.2 of the second line path 5b thus follows the first path portion 5b.1 along the longitudinal direction L in a straight line. On the second insulation 4b, only a single, third line path 5c is arranged according to FIG. 4b, which extends in a straight line along the longitudinal direction L across both the first and also second PTC thermistors 2a, 2b. With respect to the transverse direction Q, the third line path 5c is arranged in a centre portion 10c arranged between the two end portions 10a, 10b of the second electrical insulation 4b on the same. Preferentially, the third line part 5c is arranged, with respect to the transverse direction Q, centred on the second electrical insulation 4b.

In the example of FIGS. 4a, 4b, the first line path 5a—in contrast with the example of the FIGS. 2a, 2b, covers the first contacting surfaces 3a of the first PTC thermistors 2a only incompletely in each case. The second line path 5b covers the first contacting surfaces 3a of the second PTC thermistors 2b incompletely in each case. The third line path 5c covers the second contacting surfaces 3b of the first PTC thermistors 2a only incompletely in each case.

The examples or versions explained above can, so far as practical, be combined with one another.

Preferably, the first, second, third and fourth line path 5a, 5b, 5c, 5 are each formed, in all examples explained above, as electrically conductive conductor track of an electrically conductive material, for example copper, which is printed onto the first and second electrical insulation 4a, 4b respectively.

The invention claimed is:

1. A PTC heating device, comprising:
first PTC thermistors and second PTC thermistors that each have a first electrical contacting surface and a second electrical contacting surface that lie opposite one another, wherein the first PTC thermistors and the second PTC thermistors are arranged sandwich-like between a first electrical insulation and a second electrical insulation,
a first electrical line path arranged between the first PTC thermistors and the first electrical insulation, wherein the first electrical line path is electrically connected to the first contacting surface of the first PTC thermistors,
a second electrical line path arranged between the second PTC thermistors and the first electrical insulation, wherein the second electrical line path is electrically isolated from the first electrical line path and electrically connected to the first contacting surface of the second PTC thermistors,
wherein the first electrical line path and the second electrical line path have a first electrical connection and a second electrical connection respectively for connecting to an electric current source,
wherein at least one of the first electrical line path including the first electrical connection and the second electrical line path including the second electrical connection is printed on the first electrical insulation, and
wherein at least the first electrical insulation is composed of an electrically insulating ceramic material, and wherein the first electrical insulation on a longitudinal end has a projecting portion formed of the electrically insulating ceramic material that receives the first electrical connection and the second electrical connection.

2. The PTC heating device according to claim 1, wherein at least one of the first electrical insulation and the second electrical insulation is formed as a first insulation board and a second insulation board, respectively.

3. The PTC heating device according to claim 1, wherein:
at least one third electrical line path is arranged between the first PTC thermistors and the second PTC thermistors and the second electrical insulation for electrically connecting to an electric current source via a third electrical connection, and
wherein the at least one third electrical line path is electrically connected to the second contacting surface of at least one of the first PTC thermistors and the second PTC thermistors.

4. The PTC heating device according to claim 1, wherein at least one of the first electrical line path and the second electrical line path are formed as an areal conductor track that covers a respective contacting surface of the first PTC thermistors and the second PTC thermistors areally.

5. The PTC heating device according to claim 4, wherein exactly one third electrical line path is provided that is electrically connected to the second contacting surface of both of the first PTC thermistors and the second PTC thermistors.

6. The PTC heating device according to claim 4, wherein:
a third electrical line path and a fourth electrical line path are provided and are arranged on the second electrical insulation with the same path course as the first electrical line path and the second electrical line path on the first electrical insulation, and
the third electrical line path is electrically connected to the second contacting surface of the first PTC thermistors and, electrically isolated from these contacting surfaces, the fourth electrical line path is connected to the second contacting surface of the second PTC thermistors.

7. The PTC heating device according to claim 1, wherein:
the first electrical line path and the second electrical line path are arranged on a side of the first electrical insulation facing the first PTC thermistors and the second PTC thermistors; and
at least one third line path including a third electrical connection is printed on a side of the second electrical insulation facing the first PTC thermistors and the second PTC thermistors.

8. The PTC heating device according to claim 1, wherein:
at least one third line path is arranged on a side of the second electrical insulation facing the first PTC thermistors and the second PTC thermistors, the at least one third line path including a third electrical connection;
the second electrical insulation is composed of an electrically insulating ceramic; and
wherein the second electrical insulation on a longitudinal end has a projecting portion formed of the electrically insulating ceramic of the second electrical insulation that receives the third electrical connection.

9. The PTC heating device according to claim 1, wherein:
the first electrical line path covers the first contacting surface of the first PTC thermistors completely in each case,
the second electrical line path covers the first contacting surface of the second PTC thermistors completely in each case, and
at least one third electrical line path covers the second contacting surface of the first PTC thermistors and the second PTC thermistors completely in each case.

10. The PTC heating device according to claim 1, wherein all of the first PTC thermistors and the second PTC thermistors are arranged spaced apart from one another along a longitudinal direction, wherein an entirety of the second PTC thermistors follows an entirety of the first PTC thermistors in the longitudinal direction.

11. The PTC heating device according to claim 1, wherein:
the first electrical line path interconnects the first contacting surface of the first PTC thermistors along a longitudinal direction and the second electrical line path interconnects the first contacting surface of the second PTC thermistors along the longitudinal direction, and
the electrical second line path runs along the longitudinal direction past the first PTC thermistors spaced apart from the first PTC thermistors.

12. The PTC heating device according to claim 1, wherein the first electrical line path is arranged in a first end portion and the second electrical line path is arranged in a second end portion of the first electrical insulation where they extend along a longitudinal direction, and wherein the first end portion and the second end portion lie opposite one another in a transverse direction perpendicularly to the longitudinal direction.

13. The PTC heating device according to claim 1, wherein:
the second electrical line path defines a first path portion in a region of the first PTC thermistors and defines a second path portion in a region of the second PTC thermistors, and
the first path portion is arranged along a transverse direction offset relative to the second path portion.

14. The PTC heating device according to claim 1, wherein the first electrical line path ends at a transition between the first PTC thermistors and the second PTC thermistors.

15. The PTC heating device according to claim 1, wherein one of:
the second PTC thermistors are arranged offset relative to the first PTC thermistors transversely to a longitudinal direction; and
the second PTC thermistors are arranged without offset relative to the first PTC thermistors transversely to the longitudinal direction.

16. The PTC heating device according to claim 1, wherein the first electrical connection of the first electrical line path and the second electrical connection of the second electrical line path are disposed at the longitudinal end of the first electrical insulation, the first electrical insulation defining a first transverse end portion and a second transverse end portion lying opposite one another in the transverse direction, and wherein the first electrical connection and the second electrical connection are both arranged at the first transverse end portion of the first electrical insulation; and
wherein the projecting portion on the first electrical insulation is disposed at the first transverse end portion and extends longitudinally.

17. An air-conditioning system for a motor vehicle, comprising:
a PTC heating device, including:
first PTC thermistors and second PTC thermistors each having a first electrical contact surface and a second electrical contacting surface that lie opposite one another, the first PTC thermistors and the second PTC thermistors arranged sandwiched between a first electrical insulation and a second electrical insulation;
a first electrical line path arranged between the first PTC thermistors and the first electrical insulation, wherein the first electrical line path is electrically connected to the first contacting surface of the first PTC thermistors;
a second electrical line path arranged between the second PTC thermistors and the first electrical insulation, wherein the second electrical line path is electrically isolated from the first electrical line path and electrically connected to the first contacting surface of the second PTC thermistors;
wherein the second electrical line path defines a first path portion in a region of the first PTC thermistors and defines a second path portion in a region of the second PTC thermistors, and wherein the first path portion is arranged along a transverse direction offset relative to the second path portion;
wherein the first electrical line path and the second electrical line path have a first electrical connection and a second electrical connection respectively for connecting to an electric current source,
wherein at least one of the first electrical line path including the first electrical connection and the second electrical line path including the second electrical connection is printed on the first electrical insulation,
wherein at least the first electrical insulation is composed of an electrically insulating ceramic material, and wherein the first electrical insulation on a longitudinal end has a projecting portion formed of the electrically insulating ceramic that receives the first electrical connection and the second electrical connection.

18. A motor vehicle, comprising: an air-conditioning system, the air-conditioning system having a PTC heating device that includes:
first PTC thermistors and second PTC thermistors each having a first electrical contact surface and a second electrical contacting surface that lie opposite one another, the first PTC thermistors and the second PTC thermistors arranged sandwiched between a first electrical insulation and a second electrical insulation;

a first electrical line path arranged between the first PTC thermistors and the first electrical insulation, wherein the first electrical line path is electrically connected to the first contacting surface of the first PTC thermistors;

a second electrical line path arranged between the second PTC thermistors and the first electrical insulation, wherein the second electrical line path is electrically isolated from the first electrical line path and electrically connected to the first contacting surface of the second PTC thermistors; and wherein the first electrical line path and the second electrical line path, at a first longitudinal end of the first electrical insulation lying opposite to a second longitudinal end of the first electrical insulation relative to a longitudinal direction, have a first electrical connection and a second electrical connection respectively for connecting to an electric current source, the first electrical insulation defining a first transverse end portion and a second transverse end portion lying opposite one another in a transverse direction running perpendicularly to the longitudinal direction, and wherein the first electrical connection and the second electrical connection are both arranged at the first transverse end portion of the first electrical insulation;

wherein at least one of the first electrical line path including the first electrical connection and the second electrical line path including the second electrical connection is printed on the first electrical insulation;

wherein at least the first electrical insulation is composed of an electrically insulating ceramic material, and wherein the first electrical insulation on a longitudinal end has a projecting portion formed of the electrically insulating ceramic that receives the first electrical connection and the second electrical connection.

19. The motor vehicle according to claim 18, further comprising at least one third electrical line path is arranged between the first PTC thermistors and the second PTC thermistors and the second electrical insulation for electrically connecting to an electric current source, the at least one third electrical line path electrically connected to the second contacting surface of at least one of the first PTC thermistors and the second PTC thermistors; and wherein the at least one third electrical line path has a third electrical connection;

wherein the second electrical insulation is composed of an electrically insulating ceramic; and wherein the second electrical insulation on a longitudinal end has a projecting portion formed of the electrically insulating ceramic that receives the third electrical connection.

20. The PTC heating device according to claim 8, wherein the projecting portion of the second electrical insulation that receives the third electrical connection is disposed in an overlapping position with the projecting portion of the first electrical insulation that receives the first electrical connection and the second electrical connection.

* * * * *